United States Patent
Ciriza et al.

(10) Patent No.: US 7,561,294 B2
(45) Date of Patent: Jul. 14, 2009

(54) MOBILE DEVICE-ENABLED SECURE RELEASE OF PRINT JOBS USING PARALLEL DECRYPTION

(75) Inventors: Victor Ciriza, La Tour du Pin (FR); Francois Ragnet, Venon (FR); David L. Salgado, Victor, NY (US)

(73) Assignee: Xerox Corporation, Norwalk, CT (US)

( * ) Notice: Subject to any disclaimer, the term of this patent is extended or adjusted under 35 U.S.C. 154(b) by 775 days.

(21) Appl. No.: 11/348,422

(22) Filed: Feb. 6, 2006

(65) Prior Publication Data

US 2007/0182985 A1 Aug. 9, 2007

(51) Int. Cl.
*G06F 3/12* (2006.01)
*G06K 15/00* (2006.01)
(52) U.S. Cl. .................. 358/1.15; 358/1.14; 358/1.13
(58) Field of Classification Search ............... 358/1.15, 358/1.14, 1.13, 1.1, 1.16, 1.17, 1.18, 1.9, 358/407, 468, 437, 1.2, 1.4, 1.6, 1.11, 400, 358/403, 434, 435, 436, 438, 439, 450; 399/1, 399/8; 713/150, 182, 189; 380/201, 243, 380/244, 245, 246, 247, 248, 249, 250, 255, 380/270, 55; 382/303, 304, 305, 284, 180; 710/15, 18; 347/2, 3, 5, 14, 23; 715/234, 715/237, 239, 276, 277
See application file for complete search history.

(56) References Cited

U.S. PATENT DOCUMENTS 6,378,070 B1   4/2002  Chan et al.

2004/0172586 A1   9/2004  Ragnet et al.
2005/0138065 A1   6/2005  Ciriza
2006/0136726 A1*  6/2006  Ragnet et al. ............... 713/171

OTHER PUBLICATIONS

Balfanz et al., "Network-in-a-Box: How to Set Up a Secure ... ", Palo Alto Research Center Incorporated, USENIX Association, 17 pp., 2004.
"The PKI page," Public Key Infrastructure (PKI), pp. 1-18, at http://www.pki-page.org/, last visited Dec. 6, 2005.
Brochure for JetCAPS SecureJet 4.1, Hewlett-Packard Company and JetCAPS Europe Labs, 2 pp., May 26, 2003.
SecureJet White paper, Hewlett-Packard Corp., SecureJet—43c/4.5 White Paper, pp. 1-28, Edition 3, Mar. 2005.
"Hp jetcaps printing solutions guide," Hewlett-Packard, pp. 1-26, 2000.

* cited by examiner

*Primary Examiner*—Dov Popovici
(74) *Attorney, Agent, or Firm*—Fay Sharpe LLP

(57) ABSTRACT

In a printing method, content of a print job is split into a main portion and a completing portion at a user terminal (10). The main portion is encrypted using the user terminal. The encrypted main portion (32) is sent to a printing device (12). The completing portion is encrypted using a mobile device (20) operatively connected with the user terminal. The encrypted completing portion (34) is stored on the operatively connected mobile device. The mobile device is operatively disconnected from the user terminal, and is operatively connected with the printing device. After the operative connecting: (i) the encrypted main portion is decrypted using the printing device and the completing portion is decrypted using the mobile device; (ii) the decrypted main portion and the decrypted completing portion are combined to reconstruct the print job; and (iii) the reconstructed print job is executed using the printing device.

23 Claims, 3 Drawing Sheets

MOBILE DEVICE-ENABLED SECURE RELEASE OF PRINT JOBS USING PARALLEL DECRYPTION

BACKGROUND

The following relates to the printing and sheet marking arts. It is described with example illustrated reference to secure printing methods and apparatuses employing a personal data assistant (PDA) as a mobile device for securing print jobs. However, the following is amenable to other like printing methods and apparatuses employing various wired or wireless mobile devices, and to other like applications.

Information security includes many facets, such as firewalls to protect a digital network, password protection of computers and other networked devices, encryption of files and data, removable hard drives to enable information to be carried or otherwise physically secured, and so forth. However, an area where information security is sometimes less stringently enforced is the printing phase.

Typically, a user working at his or her personal computer generates and sends a print job to a printer on the network. The print job is queued at the printing system or elsewhere in the network, and the printing system processes print jobs on a first in first out (FIFO) or other ordering basis. This typical sequence of operations introduces potential information security risks.

The queued print job represents one security risk. This is typically a file in a print document language (PDL) such as PostScript, which is communicated from the personal computer to the network printing device. The PDL then resides at the printing device or at a storage queue accessed by the printing device until it is printed. The transfer and temporary storage of the PDL represent opportunities for data theft.

The physical printed sheets present another security risk. The push type nature of the printing process means that the user sends the print job to the printer, where it is printed immediately or after earlier or higher priority print jobs are processed. In either case, it is possible or perhaps even likely that the person who generated the print job will not be present at the printing device when the physical printed sheets are generated, providing another opportunity for information theft.

These information security risks are enhanced in arrangements in which a more substantial delay between the printing and user pickup of the sheets is likely, or in which the printed sheets may be generated in an unsecured location. Such an arrangement exists, for example, when a traveling business person prints confidential material using a hotel printer, or when the printing device is at a commercial print shop that is not owned or controlled by the person who generated the print job.

CROSS REFERENCE TO RELATED PATENTS AND APPLICATIONS

The following U.S. patent applications are commonly assigned with the present application, and are incorporated herein by reference:

Ragnet et al., "Method and Apparatus for Controlling Document Service Requests from a Mobile Device," U.S. patent application Ser. No. 10/605,874 filed 3 Nov. 2003, published as US 2004/0172586 A1 on Sep. 2, 2004, and relating generally at least to aspects of interaction between a mobile device and a wirelessly equipped printing device, is incorporated by reference herein in its entirety;

Ragnet et al., "Multifunction Device with Secure Job Release," U.S. patent application Ser. No. 11/013,323 filed 14 Dec. 2004 relating generally at least to aspects of secure printing employing wireless mobile devices, is incorporated by reference herein in its entirety;

Ciriza et al., "Mobile Device Enabled Secure Release of Print Jobs," U.S. patent application Ser. No. 11/348,423 filed Feb. 6, 2006 and relating generally at least to aspects of secure printing using a mobile device, is incorporated by reference herein in its entirety; and Ciriza et al., "Secure Printing via a Wireless Internet Service," U.S. patent application Ser. No. 11/347,871 filed Feb. 6, 2006 and relating generally at least to aspects of printing including accounting using a mobile device, is incorporated by reference herein in its entirety.

BRIEF DESCRIPTION

According to certain aspects illustrated herein, there is disclosed a printing method. At a user terminal, content of a print job is split into a main portion and a completing portion. The main portion is encrypted using the user terminal. The encrypted main portion is sent to a printing device. The completing portion is encrypted using a mobile device operatively connected with the user terminal. The encrypted completing portion is stored on the operatively connected mobile device. The mobile device is operatively disconnected the from the user terminal, and is operatively connected with the printing device. After the operative connecting: (i) the encrypted main portion is decrypted using the printing device and the completing portion is decrypted using the mobile device; (ii) the decrypted main portion and the decrypted completing portion are combined to reconstruct the print job; and (iii) the reconstructed print job is executed using the printing device.

According to certain aspects illustrated herein, there is disclosed a printing system. A printing device includes a network connection operatively connected with a digital network and a mobile device connector for removably operatively connecting a mobile device. A print job reconstructor (i) decrypts a main portion of a print job received via the network connection, (ii) receives a decrypted completing portion of the print job via the mobile device connector, and (iii) combines the decrypted main portion and the received decrypted completing portion to reconstruct the print job for execution using the printing device.

According to certain aspects illustrated herein, there is disclosed a print job generator. A user terminal includes a network connection operatively connected with a digital network and a mobile device connector. A print driver comprises instructions to generate page description language (PDL) data corresponding to a print job. An envelope generator comprises instructions to (i) split the PDL data into a main portion and a completing portion, (ii) encrypt and send the main portion to a printing device via the network connection and (iii) send the completing portion unencrypted to a mobile device connected with the mobile device connector, the main portion being configured for decryption at the printing device.

DETAILED DESCRIPTION

Figure 1:
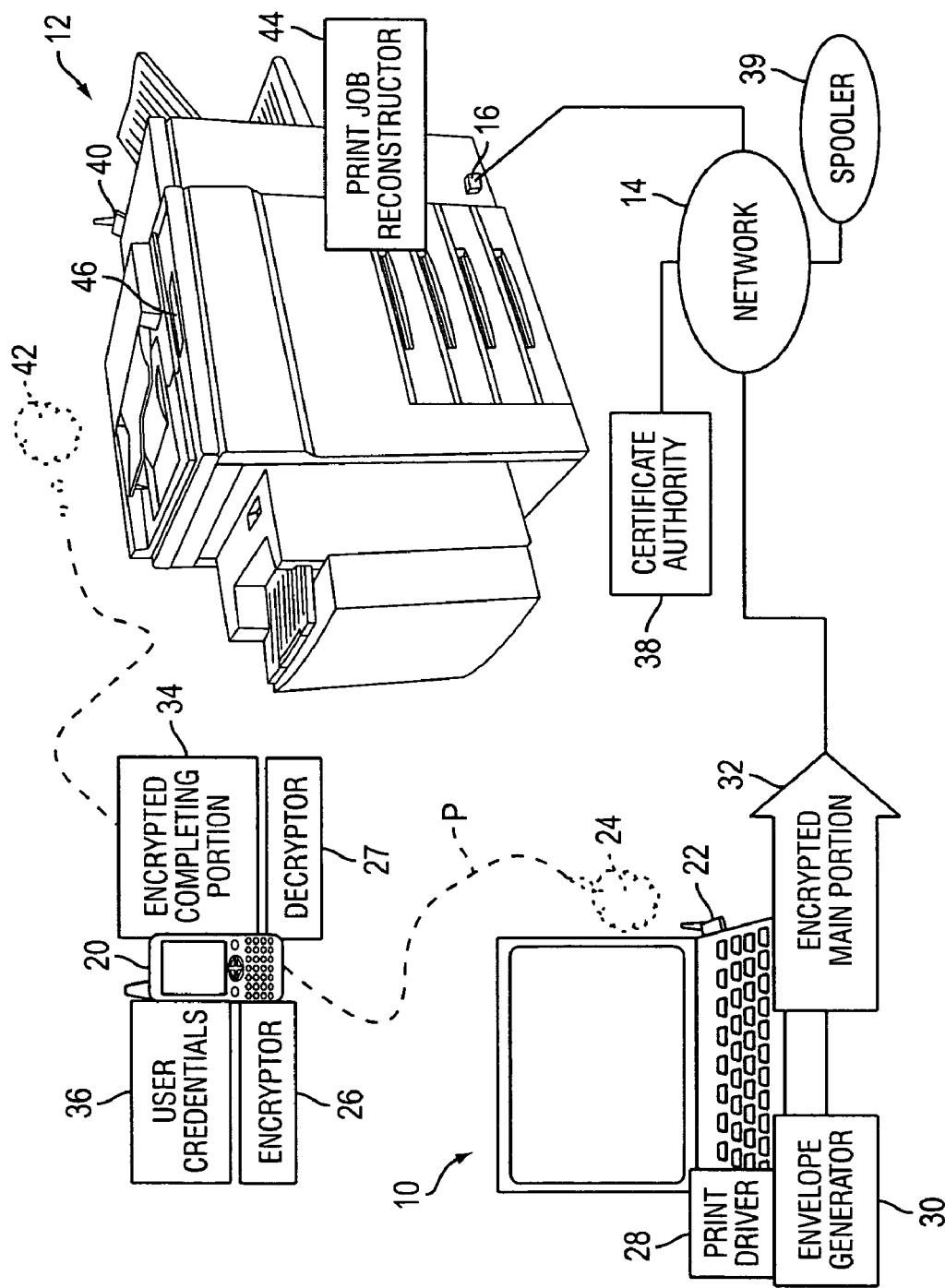
FIG. 1 diagrammatically shows a user terminal and printing device in which print jobs created at the user terminal are printed by the printing device when a mobile device illustratively embodied as a personal data assistant (PDA) is operatively disconnected from the user terminal and operatively connected with the printing device.

With reference to FIG. 1, a user terminal 10 enables an employee, professional person, business person, or other user to create, edit, or otherwise prepare or generate a document, such as a word processing document, spreadsheet document, slideshow presentation document, desktop publishing document, or so forth. The illustrated user terminal 10 is a portable laptop computer executing software such as word processing software, spreadsheet software, presentation editing software, desktop publishing software, or so forth, that is suitable for preparing the document. Instead of the illustrated portable laptop computer 10, the user terminal can be a desktop computer, a network terminal, a workstation, or so forth running suitable software. The user terminal may include various input devices such as a keyboard, mouse, trackball, or so forth, and various output devices such as a video display, audio speakers, indicator lamps, or so forth. The user elects to print the document or a portion thereof, and the software executing on the user terminal 10 creates a print job. The user also selects a destination printing device 12 accessible from the user terminal 10 via a digital network 14. The illustrated printing device 12 is a multi-function printer typically including printing, copying, facsimile, scanning, and/or other functional capabilities. In other embodiments, the printing device may be a more basic printer with a single marking engine providing only printing capabilities, or may be a more sophisticated printer including, for example, a print station controller that drives one or more local marking engines and providing a plurality of different sheet processing pathways and capabilities.

The printing device 12 is typically located away from the user terminal 10. For example, the user terminal 10 may be in the user's office or cubicle, while the printing device 12 may be in a central printing location which may be next door to the user's office or cubicle, elsewhere on the same floor as the user's office or cubicle, on a different floor from the user's office or cubicle, or in a different building or city than the user's office or cubicle. The printing system 12 includes a network connection 16 operatively connecting the printing system 12 with the network 14. In FIG. 1 the network connection 16 is a wired network connection; however, a wireless network connection such as a WLAN connection is also contemplated. Similarly, the user terminal 10 is operatively connected with the digital network 14 by a wired or wireless connection. In some embodiments, the digital network 14 may incorporate the Internet; for example, the network 14 may include a local area network or WiFi hotspot at the site of the user terminal 10, a different local area network or WiFi hotspot at the site of the printing system 12, and communication between the local area networks or WiFi hotspots via the Internet or another longer distance wired or wireless communication pathway. While the single example user terminal 10 is illustrated, typically a plurality of user terminals typically operated by various users can send print jobs to the printing system 12 via the network 14. For example, the printing system 12 may serve an office, a corporation, or so forth. In some embodiments, the printing system 12 is a commercial printing system located at a print shop or other commercial printing center.

The user is typically at the user terminal 10 when the user generates the print job. Accordingly, if the print job were to immediately print, a security risk would present itself as someone other than the user could view the printed sheets before the user travels over to the printing system 12 and picks the sheets up. Similarly, if the print job is queued for later printing (for example, if the printing system 12 has a backlog of print jobs to process from the user and from other users) then the user may again be elsewhere when the printing system 12 prints the print job. If the backlog of print jobs is long, then the queuing time for the print job can be lengthy, providing an unauthorized person with substantial time in which to hack into the networked printing device 12 and access the queued file.

To address these concerns, a mobile device 20 including non-volatile storage and processing capability is employed. The illustrated mobile device is a personal data assistant (PDA) 20 that operatively connects with the user terminal 10 via a wireless communication interface 22 of the user terminal 10. For example, the wireless communication interface 22 can be a Bluetooth wireless interface or other type of wireless interface employing a radio link, infrared link, or other wireless link. The wireless communication interface 22 suitably provides a short-range wireless connection that is wirelessly connectable with the mobile device 20 when the mobile device 20 is within a connectivity range 24 (diagrammatically indicated in FIG. 1, but typically encompassing an area or volume the size of a room, house, office floor, or similar short range area or volume containing the user terminal 10). Instead of the illustrated wireless communication interface 22, a wired operative connection may be used, such as a connection to a USB port of the user terminal 10. Instead of the illustrated PDA, the mobile device in other embodiments may be a cellular telephone, digital music player, or other mobile device that includes non-volatile storage, at least some processing capability, and the ability to removably operatively connect with the user terminal 10.

By "non-volatile storage" it is meant that the mobile device 20 can store data and can retain the stored data when it is operatively disconnected from the user terminal 10. In some embodiments, the non-volatile storage may be a magnetic disk, a writable optical disk, a FLASH memory or other solid state memory, or so forth. In some embodiments, the non-volatile memory is a medium that is intrinsically non-volatile, such as a magnetic disk that retains its contents in the absence of any applied power. In other embodiments, the non-volatile storage is a CMOS memory or other memory that is non-volatile due to being powered by an on-board battery or other energy storage device disposed on or in the mobile device. By "processing capability" it is meant that the mobile device 20 can at least embody (i) an encryptor 26 that can encrypt digital data received from the user terminal 10 and (ii) a decryptor 27 for later decryption of the encrypted digital data. Typically, the encryptor 26 and decryptor 27 are embodied as a general-purpose digital processor or controller of the mobile device executing software implementing the selected encryption or decryption algorithm; however, it is also contemplated for the encryptor 26 and decryptor 27 to be embodied in hardware alone, for example using an application-specific integrated circuit (ASIC) component of the mobile device.

At the time the user generates and sends the print job to the printing device 12, the mobile device 20 is operatively connected with the user terminal 10. In the wireless connection embodiment of FIG. 1, this corresponds to the mobile device 20 being within the connectivity range 24 of the user terminal 10 with suitable connection handshaking, device polling, or other operations appropriate for establishing the wireless connection. In a wired embodiment, this corresponds to, for example, the mobile device being connected with the user terminal 10 via a USB cable. A print driver 28 comprises instructions executing on the user terminal 10 as illustrated, or on another processor connected with the network 14, that generate page description language (PDL) data corresponding to the print job and describing content layout of one or more pages to be printed. The PDL data describes the layout of each page of graphics, text, or other content to be printed. In some embodiments, the PDL data is Postscript data. In some embodiments, the PDL data is HPGL data, PCL data, or another standard PDL format. It is also contemplated for the PDL data to be in a lower level format, such as rastered bitmap data.

In conventional printing, the PDL data is sent from the user terminal to the printing device, and the printing device operates its marking engine in accordance with the PDL data to produce printed sheets. If the printing device has a backlog of print jobs, then the PDL data is stored or buffered at the printing device or elsewhere in the network until the printing device can perform the printing. However, this conventional printing has certain security issues, including potential production of the printed pages when the user is not present, and transmission and temporary storage of the entire PDL content comprising the print job at the printing device or at another temporary storage connected with the network.

To address these security issues, an envelope generator 30 comprises instructions executing on the user terminal 10 as illustrated, or on another processor connected with the network 14, that split the PDL or other content of the print job into: (i) a main portion that is encrypted and sent as an encrypted main portion 32 to the printing system 12 via the network 14; and (ii) a completing portion that is sent to the mobile device 20 via the mobile device connector 22 where it is encrypted by the encryptor 26 of the mobile device 20 and stored on the mobile device 20 as an encrypted completing portion 34. Enhanced security is provided by this approach—the PDL is split into two portions that are physically separated and separately encrypted, namely the main portion 32 that is encrypted by the user terminal 10 and sent to the printing device 12, and the completing portion 34 that is encrypted by the encryptor 26 of the mobile device 20 and stored on the mobile device 20. Thus, even if the encrypted main portion 32 is intercepted and decrypted by an unauthorized third party, that third party will be missing the encrypted completing portion 34 and hence cannot reconstruct the print job in its entirety. Moreover, without the encrypted completing portion 34, the printing device 12 cannot inadvertently execute the print job.

In some embodiments, the main portion is encrypted by the user terminal 10 such that a decryption key generated based on user credentials 36 assigned to the user or to the mobile device 20 by a certificate authority 38 and stored on the mobile device 20 can be used to decrypt the encrypted main portion 32. For example, the user credentials 36 may be used to create a public/private session key pair, the main portion encrypted using the public session key, and the private session key needed for decryption of the encrypted main portion 32 sent to the printing device 12. Additionally or alternatively, a user-selected password can be used in encrypting the main portion. Similarly, the completing portion 34 stored on the mobile device 20 is encrypted by the mobile device 20 using a key constructed from the user credentials 36, and/or based on a password, or so forth.

The encrypted main portion 32 of the print job that is sent to the printing system 12 via the network 14 is incomplete at least in that it is missing the encrypted completing portion 34 of the content of the print job. Since the encrypted main portion 32 is missing some of the PDL data, the encrypted main portion 32 cannot be printed without the encrypted completing portion 34 stored on the mobile device 20. Accordingly, the encrypted main portion 32 sent to the printing system 12 via the network 14 is stored in an internal buffer of the printing device 12 or in a spooler 39 or other buffer accessible to the printing system 12 via the network 14.

In order to cause the printing system 12 to execute the print job, the user operatively disconnects the mobile device 20 from the user terminal 10, carries it along a physical path P from the user terminal 10 to the printing device 12 (path P diagrammatically indicated by a meandering dashed line in FIG. 1, but to be understood as including any suitable path which may include any number of diversions such as a lunchroom visit or so forth), and operatively connects the mobile device 20 with the printing device 12. The illustrated operative connection with the printing device 12 is via a wireless communication interface 40 of the printing device 12. For example, the wireless communication interface 40 can be a Bluetooth wireless interface or other type of wireless interface employing a radio link, infrared link, or other wireless link. The wireless communication interface 40 suitably provides a short-range wireless connection that is wirelessly connectable with the mobile device 20 when the mobile device 20 is within a connectivity range 42 (diagrammatically indicated in FIG. 1, but typically encompassing an area or volume the size of a room, house, office floor, or similar short range area or volume containing the printing device 12). Instead of the illustrated wireless communication interface 40, a wired operative connection may be used, such as a connection to a USB port of the printing device 12. Typically, the same type of operative connector will be used to connect the mobile device 20 with both the user terminal 10 and the printing device 12—for example, in FIG. 1 the wireless communication interfaces 22, 40 are typically similar and typically employ the same wireless communication protocol. However, it is also contemplated to employ different operative connectors at the user terminal and the printing device. For example, it is contemplated that if the mobile device is equipped for both short-range wireless communication and wired USB connection, then for example the mobile device might connect with the user terminal wirelessly but employ the USB connection at the printing device.

Because the mobile device 20 has the encrypted completing portion 34 stored in non-volatile memory, the encrypted completing portion 34 remains stored on the mobile device 20 when it is carried along the physical path P, and is available to the printing system 12 upon operative connection of the mobile device 20 with the printing device 12. Moreover, the operative connection of the mobile device 20 with the printing device 12 provides assurance that the user is physically present at the printing device 12 at the time the connection is made. That is, the printing is a "pull" type printing in which the user triggers print job execution at the end point, that is, at the printing device 12.

A print job reconstructor 44 executes on the printing device 12 or on another processor communicating with the printing device 12 via the network 14. In some embodiments, operation of the print job reconstructor 44 is initiated based on background monitoring of the wireless communication interface 40, such that when the interface 40 detects and connects with the mobile device 20 the print job reconstructor searches for and locates the encrypted completing portion 34 and initiates print job reconstruction. In other embodiments, the user operates a touch screen LCD display 46 or other user interfacing component of the printing device 12 in order to request execution of the print job, thus invoking the print job reconstructor 44. The latter approach has the advantage of not involving background monitoring by the printing device's operating system.

The print job reconstructor 44 receives the encrypted main portion 32 of the print job and the encrypted completing portion 34 and reconstructs the PDL data of the print job therefrom. The reconstruction performed by the print job reconstructor 44 includes decrypting the data of the main portion 32 using a decryption key or keys read off the mobile device 20, or using a password entered by the user via the LCD display 46 or other user interfacing component, or so forth. Additionally, the print job reconstructor 44 causes the decryptor 27 of the mobile device 20 to decrypt the encrypted completing portion 34 stored on the mobile device 20. The print job reconstructor 44 combines the decrypted main portion and the decrypted completing portion to reconstruct the PDL data, and the printing system 12 processes the reconstructed PDL data to execute the print job. For example, if the PDL data is in Postscript, HPGL, PCL, or like format, then the printing system 12 executes the print job by rastering the PDL to generate rastered data and driving one or more marking engines to mark sheets of paper or another print medium in accordance with the rastered data. The reconstruction and rastering or other PDL data processing is typically relatively quick, and so the sheets are printed relatively soon after the user operatively connects the mobile device 20 with the printing device 12 and optionally selects to execute the print job. Thus, assurance is provided that the user is physically present at the printing device 12 when the printed sheets are produced. The print job is pulled by the user located at the printing device 12.

Figure 2:
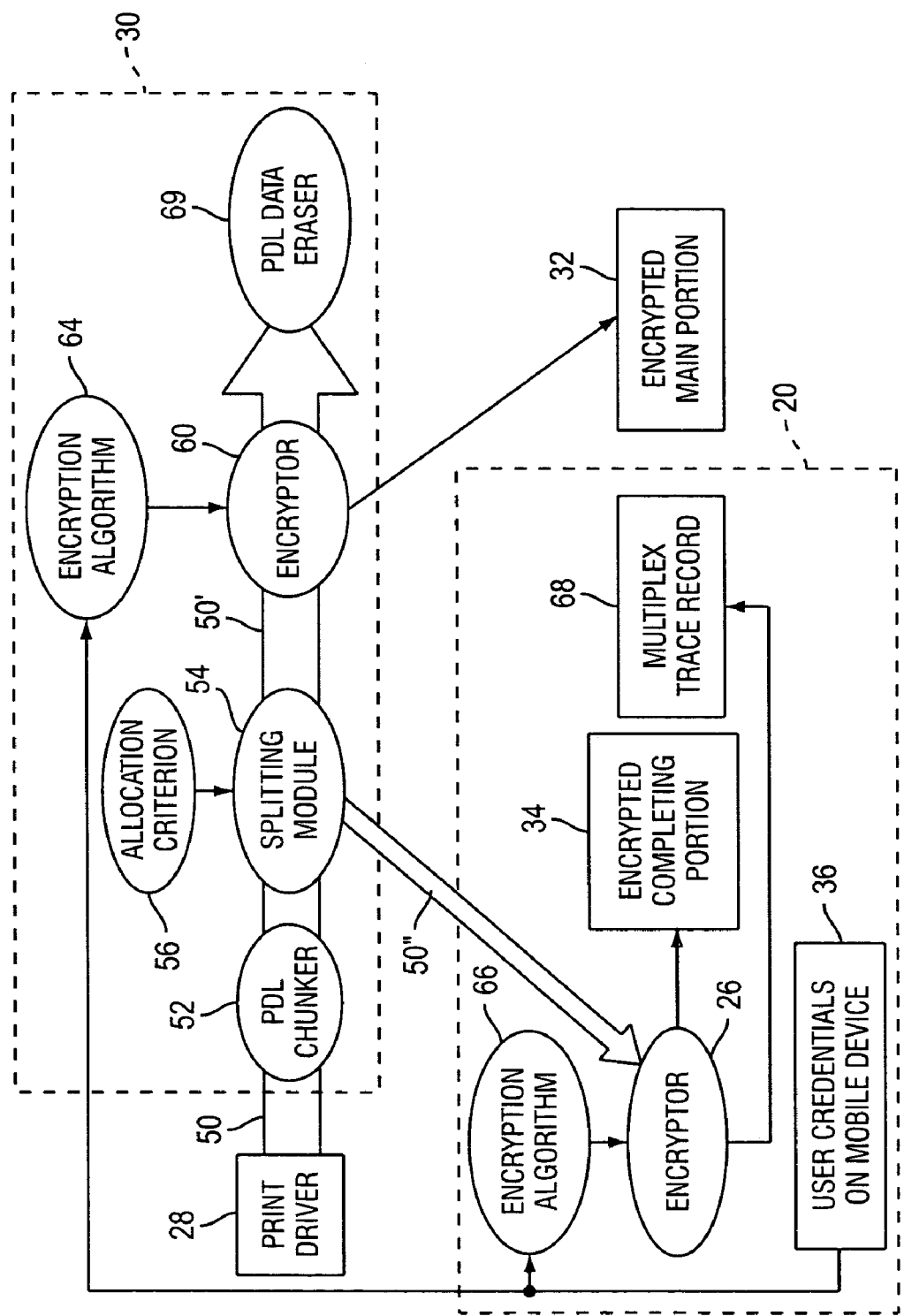
FIG. 2 diagrammatically shows the envelope generator of the user terminal and related elements.

With reference to FIG. 2, some example embodiments of the envelope generator 30 are described. The print driver 28 produces a PDL data stream 50 that is input to the envelope generator 30. A chunker 52 chunks or blocks the PDL data stream 50 into PDL chunks or blocks suitable for independent encryption and processing. A splitting module 54 allocates PDL chunks to the main portion or the completing portion based on an allocation criterion 56, to produce a chunked main PDL data stream portion 50' and a chunked completing PDL data stream portion 50". In some embodiments, the allocation criterion 56 allocates PDL chunks with at least about 60% of the PDL data going into the main portion 50' and less than or about 40% of the PDL data going into the completing portion 50". In some embodiments, the allocation criterion 56 allocates PDL chunks with at least about 90% of the PDL data going into the main portion 50' and less than or about 10% of the PDL data going into the completing portion 50". In general, allocating a greater portion of the PDL data to the mobile device 20 enhances security (assuming the user keeps the mobile device 20 securely on his or her person), but bandwidth limitations on data transfer to and from the mobile device 20 may result in slower processing with increasing portion of PDL data on the mobile device 20.

In some embodiments, the allocation criterion 56 is computationally straightforward, for example, allocating the first 85% of the PDL data to the main portion 50' and the remaining 15% to the completing portion 50". However, this approach provides relatively less security since a large portion of the document is stored in the main portion in a contiguous manner. For enhanced security, the allocation criterion 56 optionally splits the PDL chunks between the main and completing portions using a random or pseudorandom selection process, so that the main portion 50' and completing portion 50" each include a plurality of non-contiguous PDL chunks. Such injection of randomness or pseudo-randomness into the splitting of the PDL data makes it substantially more difficult to intercept portions of the decrypted file through time-based attacks. It is also contemplated to employ non-contiguous multiplexing and demultiplexing of PDL chunks on a sequential or other pre-determined basis rather than a random or pseudorandom basis. Using a predetermined allocation simplifies the splitting computations but may reduce the level of provided security.

In another approach for enhancing security, the allocation criterion 56 optionally splits the PDL chunks based on content of the PDL chunks, with more security-sensitive PDL chunks being allocated (or being biased toward being allocated) to the completing portion 50" destined for encryption by and storage on the mobile device 20. PDL content can be accounted for in the allocation criterion 56 in various ways, such as based on user annotations to the print job indicating higher sensitivity of certain document portions, or based on keywords. As an example of a keywords-based splitting approach, a PDL chunk may be allocated (or biased toward being allocated) to the completing portion 50" when the PDL chunk contains certain keywords indicative of high sensitivity. Such keywords may include, for example, nomenclature used in product development projects that are being kept as trade secrets, or monetary quantities that are likely to be sensitive.

A still more complex allocation criterion may include content based allocation bounded by split range limits. For example, sensitive PDL chunks may be directed toward the completing portion 50" with the limitation that the completing portion cannot exceed 10% of the PDL data or be less than 5% of the PDL data. In such an approach, the content is used to bias the allocation toward or away from the completing portion, such biasing being limited however by the 5%-10% allocation range for the completing portion 50". Similar bounds can be placed on random or pseudorandom splitting, for example to ensure that the random allocation of PDL chunks does not overflow a finite storage capacity of the mobile device 20.

The main portion 50' of the chunked PDL data is encrypted using an encryptor 60 executing on the user terminal 10 as part of the envelope generator 30 to generate the encrypted main portion 32 that is sent to the printing device 12. The completing portion 50" of the chunked PDL data is encrypted using the encryptor 26 executing on the mobile device 20 to generate the encrypted completing portion 34 that is stored on the mobile device 20. Parallel encryption by the user terminal 10 and the mobile device 20 provides relatively faster encryption versus encryption by the user terminal alone.

The encryptor 60 of the user terminal 10 uses an encryption algorithm 64 which may in general be any suitable encryption algorithm based on an encryption key, a password, or so forth. Similarly, the encryptor 26 of the mobile device 20 uses an encryption algorithm 66 which may in general be any suitable encryption algorithm based on an encryption key, a password, or so forth. The encryption algorithms 64, 66 may be the same, or may be different. One or both of the encryption algorithms 64, 66 optionally use the user credentials 36 stored on the mobile device 20 or optionally use encryption keys derived therefrom.

For random, pseudo-random, content-based, or other complex allocation criterion 56, a record should be made of the PDL chunk allocations so as to facilitate later reconstruction of the PDL data stream. Accordingly, a multiplex trace record 68 is generated by the splitting module 54 and is stored on the mobile device 20, as illustrated, or as part of the main portion that is sent to the printing device via the network 14. In the illustrated embodiment, the record 68 is encrypted by the encryptor 26. Alternatively, different encryption algorithms can be used for the completing data and the record, to provide enhanced security. In embodiments in which the record is stored with the encrypted main portion, the record is optionally encrypted by the user terminal using the same or a different encryption than the encryption used for the main portion.

To provide faster encryption, the generating of the PDL data by the print driver 28 can be performed concurrently with the PDL chunking, allocating, and encrypting of the main and completing portions 32, 34. To provide enhanced security, the generated PDL data that has been encrypted may be deleted by a PDL data eraser 69 concurrently with the generating, such that at least some generated PDL data that has been encrypted is deleted before the entire PDL data set is completely generated. In this way, it is ensured that the unencrypted PDL data set never exists in its entirety at the user terminal 10.

Figure 3:
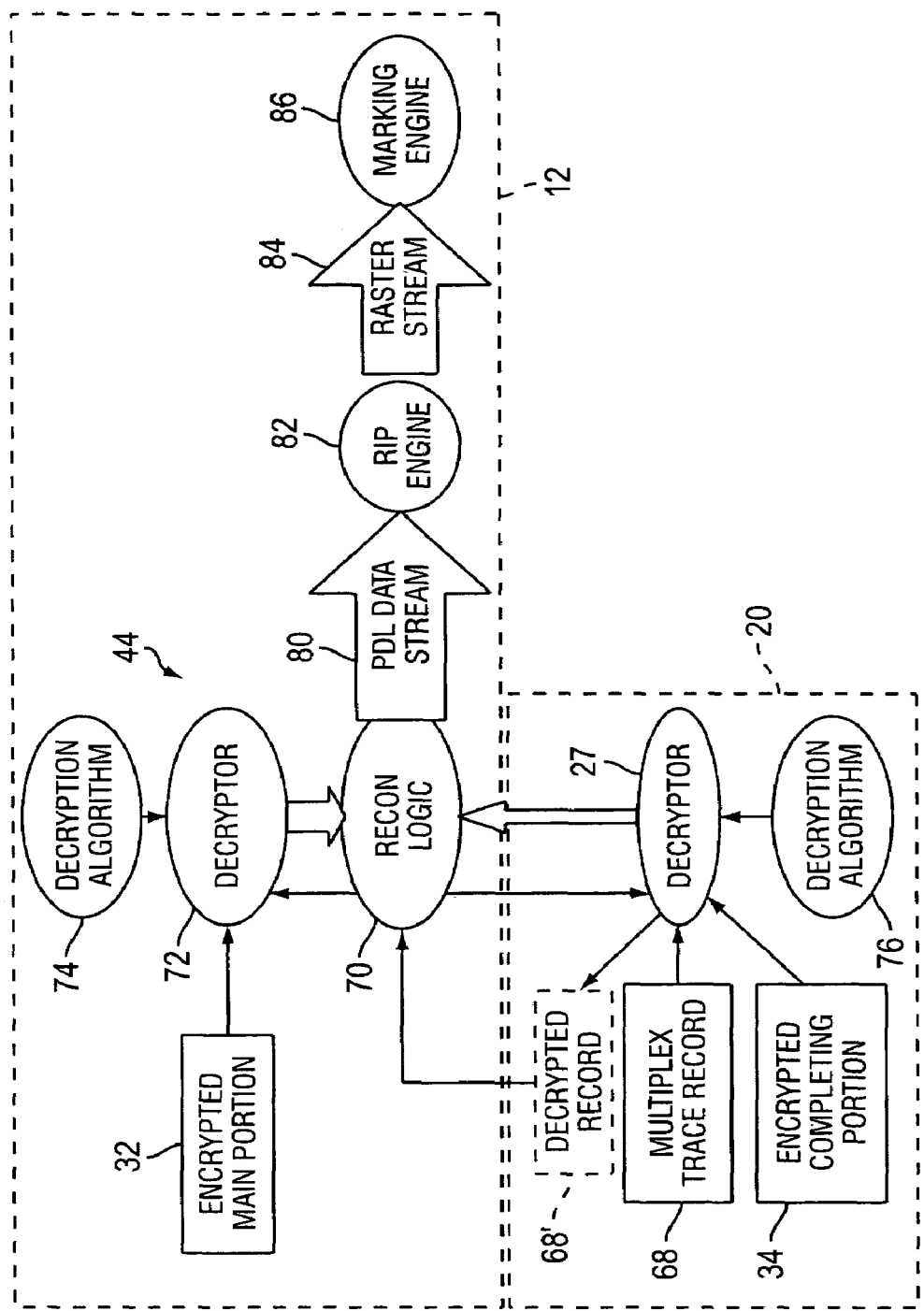
FIG. 3 diagrammatically shows the print job reconstructor of the printing device, the decryptor of the mobile device, and related elements.

With reference to FIG. 3, some example embodiments of the print job reconstructor 44 are described. Reconstruction logic 70 coordinates parallel decryption performed by the printing device 12 and the mobile device 20. The printing device 12 includes a decryptor 72 that decrypts the encrypted main portion 32 received via the network 14 based on a decryption algorithm 74 corresponding to the encryption algorithm 64 employed by the user terminal 10. The decryptor 27 of the mobile device 20 decrypts the encrypted completing portion 34 based on a decryption algorithm 76 corresponding to the encryption algorithm 66 used by the mobile device 20. The decryptor 27 also decrypts the multiplex trace record 68, and temporarily stores a decrypted record 68' on the mobile device 20 to facilitate the print execution. (In other embodiments, it is contemplated to decrypt only the presently used portion of the encrypted record 68, so as to further enhance security. This can be done, for example, by chunking the record and encrypting the record chunks in a manner analogous to the described chunked encryption of the PDL data.) The reconstruction logic 70 coordinates the parallel decryption and combines the decrypted PDL chunks in their correct contiguous order based on the decrypted record 68'. The output of the reconstruction logic 70 is a PDL data stream 80 which should correspond to the PDL data stream 50 output by the print driver 28 (see FIG. 2). The PDL data stream 50 is processed by a raster image processing (RIP) engine 82 to produce a raster stream 84 that serves as input to one or more marking engines 86 of the printing device 12 that mark sheets of print media in accordance with the rasterized PDL data stream 80.

To provide enhanced security, the decryption of the main and completing portions 32, 34 is optionally performed concurrently with combining the decrypted PDL chunks into the reconstituted PDL data stream and further concurrently with the executing of the print job based on the reconstituted PDL data stream. In this way, the print job is reconstructed as a just-in-time data stream for execution by the printing device 12. For example, the decrypting may be performed on a per-chunk basis and the print job executed on a per-chunk basis as the PDL chunks are decrypted. Once the PDL chunk is decrypted and executed by the marking engine, the PDL chunk is suitably deleted to ensure that the PDL content is never present in its entirety on the printing device 12. Block-based cryptography is suitably employed, in which decryption is performed on a per-PDL chunk basis in dynamically allocated memory buffers to reconstruct small portions of the PDL file. Small decrypted chunks are assembled or combined in memory until a complete page is built, and which point the PDL of that page is sent to the RIP engine 82 for execution. Moreover, in some embodiments, the operation of the marking engine or engines 86 is monitored, and if a print-stopping malfunction is detected (such as running out of paper, toner, or another consumable, a break-down of the marking engine, or so forth), then decryption is suspended until the printing resumes, so as to avoid accumulating decrypted PDL content in the buffer of the printing device 12.

These approaches enhance security at the printing device 12 by leveraging a typical operational feature of printing devices which typically operate on a stream of data, and hence do not need the full PDL file before beginning processing, but instead can work on a raster-scan line (which might depend on the printer) or more predictably, page-per-page. Typically, the raster image processor engine 82 operates on a buffer, and is able to work page-per-page or even on a subset of a page with data in the memory. Thus, by decrypting and accumulating PDL chunks until a page or other printable unit is available for processing, and by further performing some of this decryption on the mobile device 20, the amount of unencrypted PDL data present at any given time on the printing device 12 is substantially reduced, thus enhancing security without concomitant degradation in printing speed or quality.

In the embodiment of FIG. 3, the reconstruction logic 70 resides on and executes on the printing device 12. That is, the printing device 12 coordinates the reconstruction. In other embodiments, some or all of the reconstruction logic may reside on and execute on the mobile device, so that the mobile device partially or entirely coordinates the print job reconstruction. The skilled artisan can make other choices as to the precise division of processing between the printing device 12 and the mobile device 20. Keeping the decrypted record 68' on the mobile device 20 has certain security advantages, since if the print job is aborted due to a marking engine malfunction, running out of toner or paper, or so forth, then the decrypted trace 68' is taken away with the mobile device 20 when the user leaves the printing device 12. However, it is also contemplated to store the decrypted record 68' on the printing device 12, which may in some instances provide for faster reconstruction of the print job.

A more detailed illustrative example of operation of the secured document printing is now provided. In this example, the PDL data is generated as a file on the user terminal 10. A secured document envelope's skeleton is built at the user's desktop. The envelope of the main portion 32 has a skeleton in which to place information about: job submitter, such as user name and public key; information about the printing system 12, such as device name, uniform resource indicator (URI) on the network 14, and the printing system's public key; information about the mobile device 20, such as device name or MAC address, device type (such as a PDA) and the public key of the user credentials 36; and information about the document, such as the PDL data, encryption method information, and a sub-tree or other structural information about the encrypted elements including the document itself. The PDL data stream 50 is chunked in accordance with the splitting allocation criteria 56 into two streams 50', 50" that are processed and encrypted independently by the user terminal 10 and the mobile device 20, respectively, and the multiplexing pattern is recorded in the multiplexing trace record 68. The first PDL stream 50' is encrypted using a first session key by the user terminal 10 to generate the encrypted main portion 32 and spooled to the printing device 12, optionally via a print server, spooler 39, or other intermediary. The printing device 12 identifies the incoming job as a secure print request, suitably stores it in a "secure print" dedicated space, and registers it on the print queue with a suitable status field such as "Waiting for Release". Additionally, the printing system 12 optionally checks the validity of any certificates associated to the encrypted main portion 32, in order to verify that none of the certificates associated with the identities used to submit or release the job are in a certificate revocation list issued by the certificate authority 38. Optionally, the printing system 12 employs the Online Certificate Status Protocol to check certificates in real time. Certificate checking is advantageous so as to counteract possible man in the middle attacks. The second PDL stream 50" is encrypted using a second session key by the mobile device 20 to produce the encrypted completing portion 34 which is stored along with the multiplexing trace record 68 on the mobile device 20.

The printing device 12 scans its environment (for example, using the Wi-Fi, Bluetooth, or other wireless communication interface 40) searching for the print triggering mobile device 20 to enter in its connectivity range 42. In other embodiments, the printing device 12 waits for a port connect event indicating that the print triggering mobile device 20 has made a wired or wireless connection with the printing device 12. The mobile device 20 checks the digital signature, decrypts the session key with its private key and shows the decrypted details of the document (such as document title and creation date) on the display of the mobile device 20 in order to let the user identify the job. If the mobile device 20 has no display it can push back to the printing device 12 the decrypted document information in order to display this information on the LCD display 46 of the printing device 12. If the user agrees to release the job, then the printing device 12 and the mobile device 20 decrypt the encrypted PDL chunks and re-assemble the PDL data stream for execution by the printing device 12. The user collects the printouts and leaves. Once the printing is completed, the encrypted main portion 32 is removed from the hard disk drive or other non-volatile storage of the printing device 12, and the completing portion 34 is removed from the non-volatile memory of the mobile device 20.

Advantageously, the full print job is never completely decrypted at the printing system 12. Moreover, the encrypted PDL is difficult to improperly access. Not only would an unauthorized person have to know how the file was split (that is, the content of the multiplexing trace record 68) and find the session key for the encrypted main portion 32, but the unauthorized person would also need to find the private key stored on the mobile device 20 to be able to access the completing portion 34. An additional benefit is that the user can be sure that if any incident, such as a paper jam, affects the availability of the printer and therefore forces termination of print job execution, the print job remains secure because the decrypted record 68' is located on the mobile device 20, which the user preferably carries away as he or she leaves the malfunctioning printing device 12. Accordingly, walking away from the printing device 12 will break the short-range communication link, stop the protocol and result in at most a partial and probably non-valid print-ready file.

Parallel decryption using both the printing device 12 and the mobile device 20 also has the advantage of providing faster decryption and hence potentially faster print job execution. Optionally, the ratio of sizes of the encrypted main portion 32 and the completing portion 34 are selected to reduce decryption time during pulling of the print job at the printing device 12. This ratio can be calculated at the time of the encryption of the original PDL file at the user terminal 12 if the decrypting power/speed of the printing device 12 is known (for example, when using a driver which is specific to a printer with well known characteristics), and the decryption processing power of the mobile device 20 can also be estimated. With such decryption speed estimates, the ratio of sizes of the encrypted main portion 32 and the completing portion 34 can be calculated so that, given the estimated processing power of the two devices 12, 20 and their estimated decryption speed (for the decryption algorithms implemented by the two devices 12, 20), the two encrypted portions 32, 34 can be processed in about the same amount of time, thus reducing the overall decryption time.

In some situations, the identity of the printing device may not be known ahead of time. For example, a small business may have its printing done at a commercial copy shop. The specific printing device is not known prior to printing. (Indeed, the user may not even know which print shop he or she will use). In this case, the process for generating the encrypted main portion 32 and the encrypted completing portion 34 is as set forth previously, with the addition that the encrypted main portion 32 is not directly spooled to the printer, but rather is spooled to an Internet accessible location (for example, suitably represented in FIG. 1 by identifying the network 14 as the Internet and the spooler 39 as the Internet accessible location). The mobile device 20 further stores a URL of the Internet accessible location and a pointer (such as a serial number, access code, or so forth) identifying the encrypted main portion 32. The user then goes to the print shop or other printing location and operatively connects the mobile device 20 with a chosen printing device to pull the print job. The print job reconstructor of the chosen printing device is configured to read the URL from the mobile device 20 and to go to the Internet accessible location to download the encrypted main portion 32. The remaining reconstruction processing is as set forth previously.

This latter approach is also usable to print documents in cases where the user terminal 10 and the printing system 12 are on different networks. In effect, the Internet is used as a joining network connection so that the network 14 includes the Internet, and the spooling to the Internet accessible location coupled with the URL and pointer stored as part of the completing information defining the network connection through the Internet.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A printing method comprising:
   at a user terminal, splitting content of a print job into a main portion and a completing portion;
   encrypting the main portion using the user terminal, the encrypted main portion being sent to a printing device;
   encrypting the completing portion using a mobile device operatively connected with the user terminal, the encrypted completing portion being stored on the operatively connected mobile device;
   operatively disconnecting the mobile device from the user terminal;
   operatively connecting the mobile device with the printing device and after the operative connecting (i) decrypting the encrypted main portion using the printing device and decrypting the completing portion using the mobile device, (ii) combining the decrypted main portion and the decrypted completing portion to reconstruct the print job, and (iii) executing the reconstructed print job using the printing device.

2. The printing method as set forth in claim 1, wherein the mobile device is selected from a group consisting of: a personal data assistant (PDA), a cellular telephone, and a digital music player.

3. The printing method as set forth in claim 1, wherein the operative connecting is selected from a group consisting of: (i) physically connecting the mobile device with the printing device, and (ii) wirelessly connecting the mobile device with the printing device.

4. The printing method as set forth in claim 1, wherein a key for decrypting the encrypted main portion is stored on the mobile device, the printing device retrieving said key from the operatively connected mobile device to perform the decrypting of the encrypted main portion.

5. The printing method as set forth in claim 1, wherein the encrypting further comprises:
incorporating digitally signed identifiers into the encrypted main portion and the encrypted completing portion, the digitally signed identifiers being used after the operative connecting to associate the main portion and the completing portion.

6. The printing method as set forth in claim 1, wherein the splitting comprises:
generating page description language (PDL) data corresponding to the print job and describing content layout of one or more pages to be printed;
chunking the PDL data into a plurality of PDL chunks;
allocating PDL chunks to the main portion and to the completing portion such that the main portion and the completing portion are each allocated a plurality of non-contiguous PDL chunks; and
generating a record of the allocations, said record being employed to reconstruct the print job from the decrypted main portion and the decrypted completing portion.

7. The printing method as set forth in claim 6, further comprising:
encrypting the record of the allocations using the mobile device operatively connected with the user terminal, the encrypted record being stored on the operatively connected mobile device.

8. The printing method as set forth in claim 6, wherein the decrypting, combining, and executing are performed concurrently in accordance with the record to reconstruct the print job as a just-in-time data stream for the executing.

9. The printing method as set forth in claim 6, wherein the decrypting is performed on a per-chunk basis and the executing operates on a per-chunk basis as the chunks are decrypted.

10. The printing method as set forth in claim 6, wherein the generating, chunking, allocating, and encrypting of the main and completing portions are performed concurrently, the printing method further comprising:
deleting generated PDL data that has been encrypted such that at least some generated PDL data is deleted before the generating is completed.

11. The printing method as set forth in claim 6, wherein the allocating comprises:
randomly or pseudorandomly allocating PDL chunks to the main portion and to the completing portion.

12. The printing method as set forth in claim 6, wherein the allocating comprises:
selecting PDL chunks for allocation to the completing portion based on content of the PDL chunks.

13. The printing method as set forth in claim 6, wherein the allocating allocates at least about 60% of the PDL data to the main portion.

14. The printing method as set forth in claim 6, wherein the allocating allocates at least about 90% of the PDL data to the main portion.

15. The printing method as set forth in claim 1, wherein the encrypting of the main portion comprises:
encrypting the main portion based on user credential information stored on the operatively connected mobile device.

16. The printing method as set forth in claim 1, wherein the encrypting of the completing portion comprises:
encrypting the completing portion based on user credential information stored on the operatively connected mobile device.

17. A printing system comprising:
a printing device including a network connection operatively connected with a digital network and a mobile device connector for removably operatively connecting a mobile device; and
a printjob reconstructor that (i) decrypts a main portion of a print job received via the network connection, (ii) receives a decrypted completing portion of the print job via the mobile device connector, and (iii) combines the decrypted main portion and the received decrypted completing portion to reconstruct the print job for execution using the printing device.

18. The printing system as set forth in claim 17, wherein the print job reconstructor comprises:
a decryptor performing the decryption of the main portion of the print job; and
reconstruction logic coordinating the decryptor and communication via the mobile device connector in accordance with a record of allocation of chunks of the print job between the main portion and the completing portion.

19. The printing system as set forth in claim 18, wherein the reconstruction logic receives a multiplex trace record via the mobile device connector.

20. The printing system as set forth in claim 17, wherein the mobile device connector is selected from a group consisting of: (i) a USB port, and (ii) a wireless communication interface employing one of a radio link and an infrared link.

21. A print job generator comprising:
a user terminal including a network connection operatively connected with a digital network and a mobile device connector;
a print driver comprising instructions to generate page description language (PDL) data corresponding to a print job; and
an envelope generator comprising instructions to (i) split the PDL data into a main portion and a completing portion, (ii) encrypt and send the main portion to a printing device via the network connection and (iii) send the completing portion unencrypted to a mobile device connected with the mobile device connector, the main portion being configured for decryption at the printing device.

22. The print job generator as set forth in claim 21, wherein the envelope generator further comprises instructions to (iv) generate a record of allocation of PDL data between the main portion and the completing portion and (v) send the record to the mobile device connected with the mobile device connector.

23. The print job generator as set forth in claim 21, wherein (i) the mobile device connector is selected from a group consisting of a wired connection and a wireless communication interface and (ii) the network connection is selected from a group consisting of a wired connection and a wireless communication interface.

* * * * *